Nov. 4, 1969  C. E. CURRY  3,476,516
GAS ANALYZER
Filed Sept. 12, 1966  5 Sheets-Sheet 1
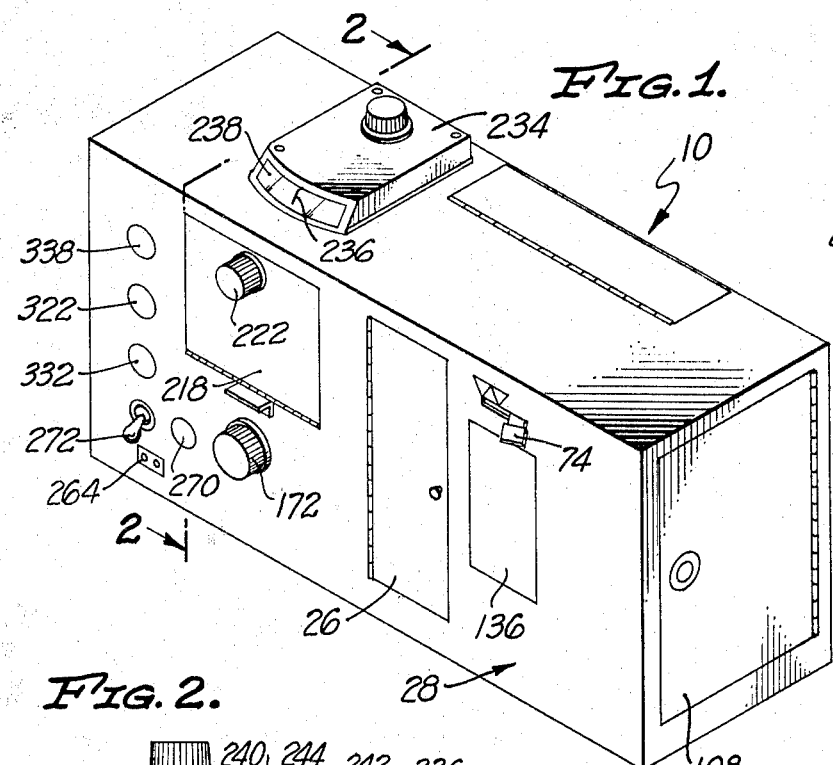
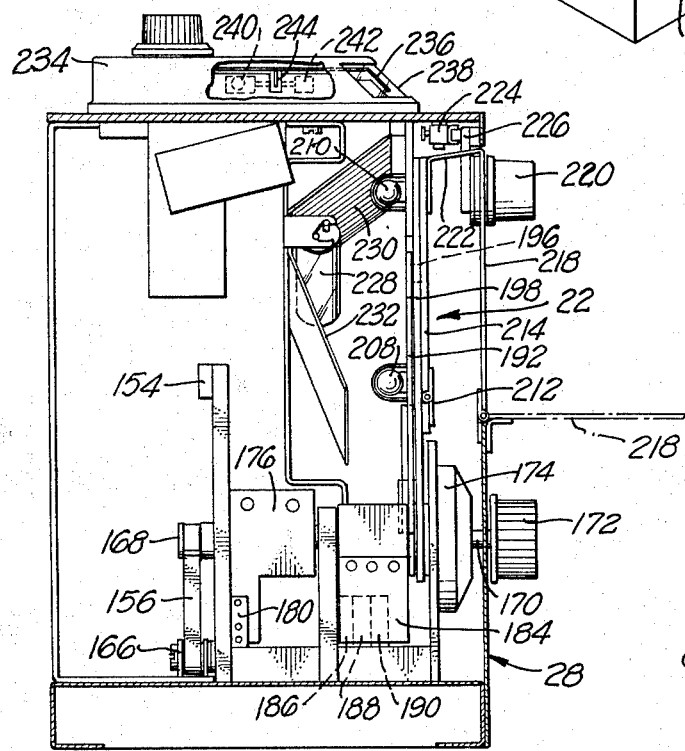
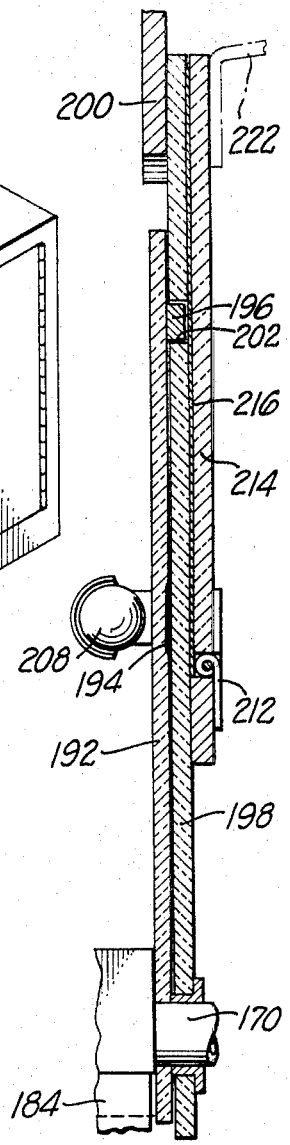
INVENTOR
CHARLES E. CURRY
BY
EDWARD D. O'BRIAN
ATTORNEY

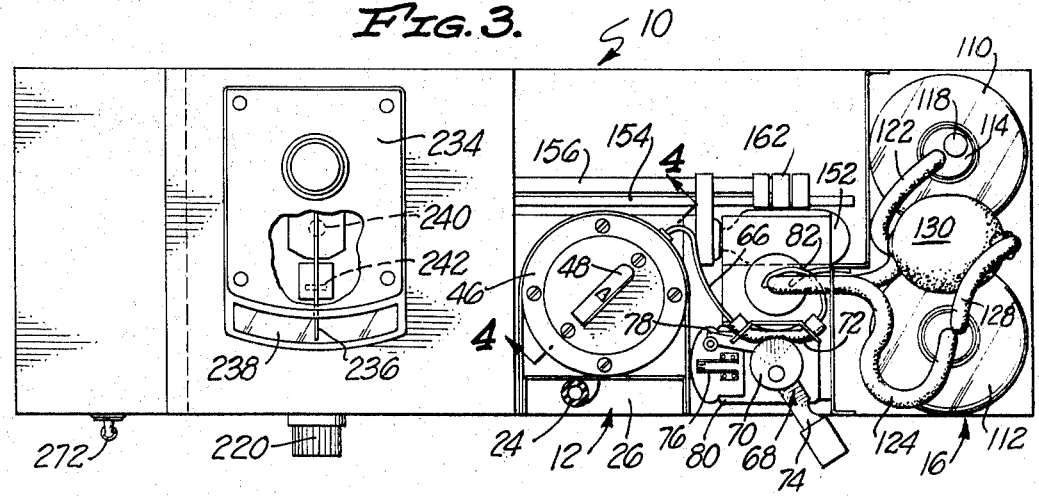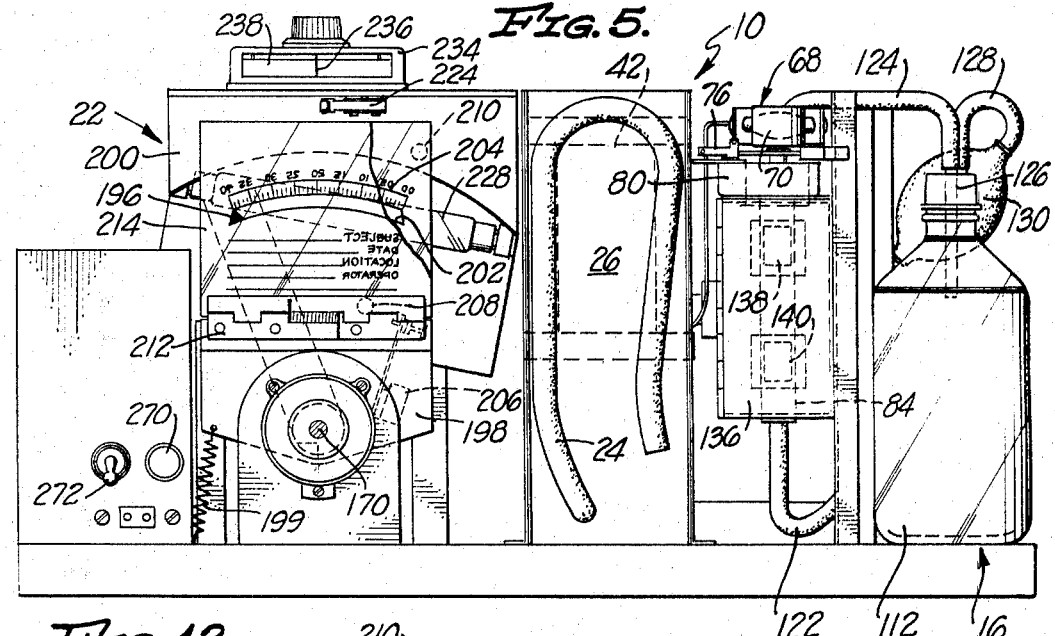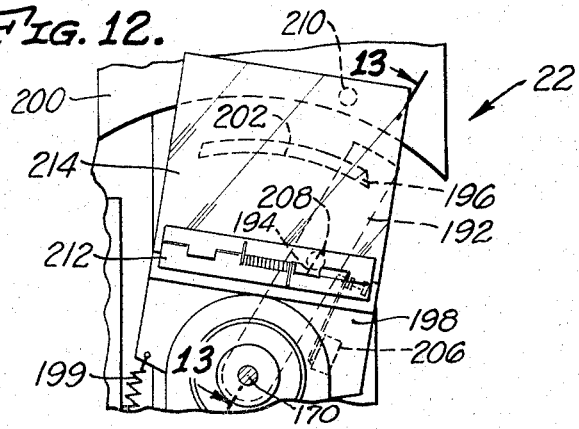

Nov. 4, 1969  C. E. CURRY  3,476,516
GAS ANALYZER
Filed Sept. 12, 1966  5 Sheets-Sheet 3
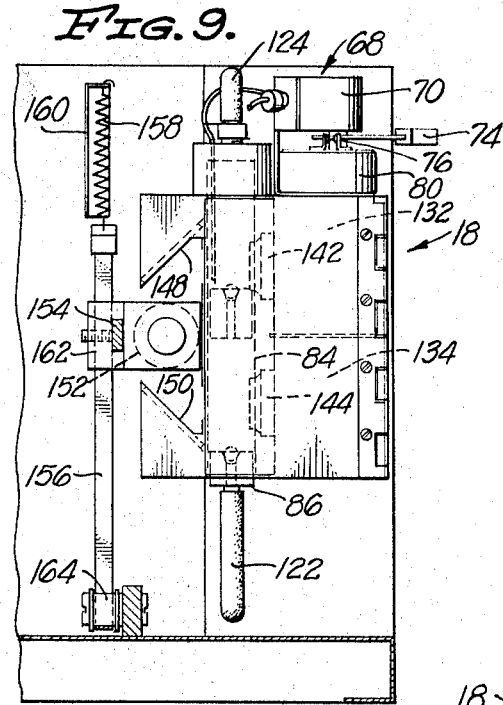
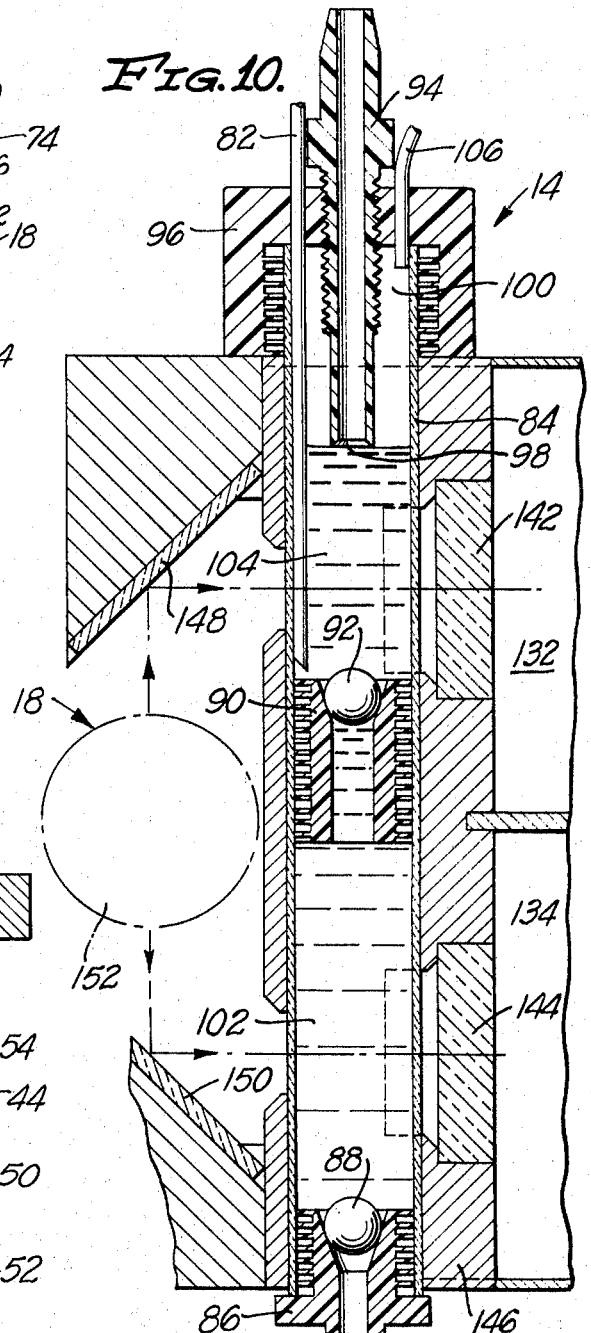
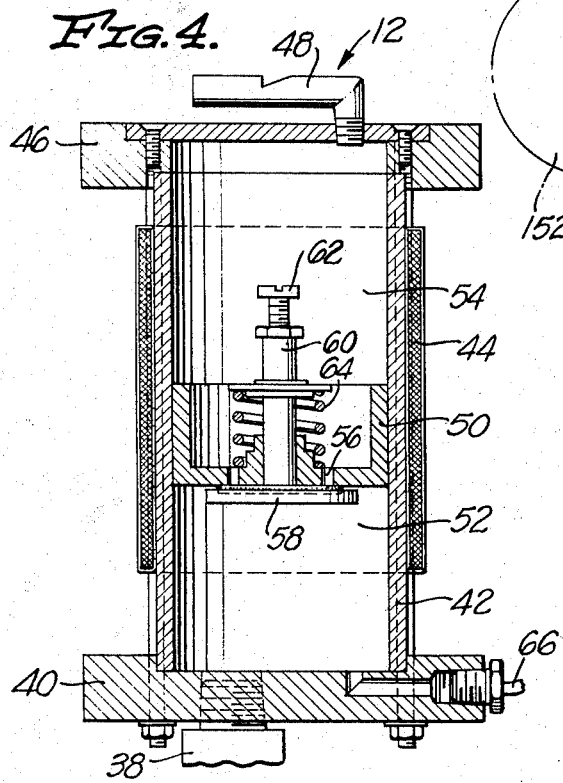
INVENTOR
CHARLES E. CURRY
BY
EDWARD D. O'BRIAN
ATTORNEY

INVENTOR
CHARLES E. CURRY
BY
EDWARD D. O'BRIAN
ATTORNEY

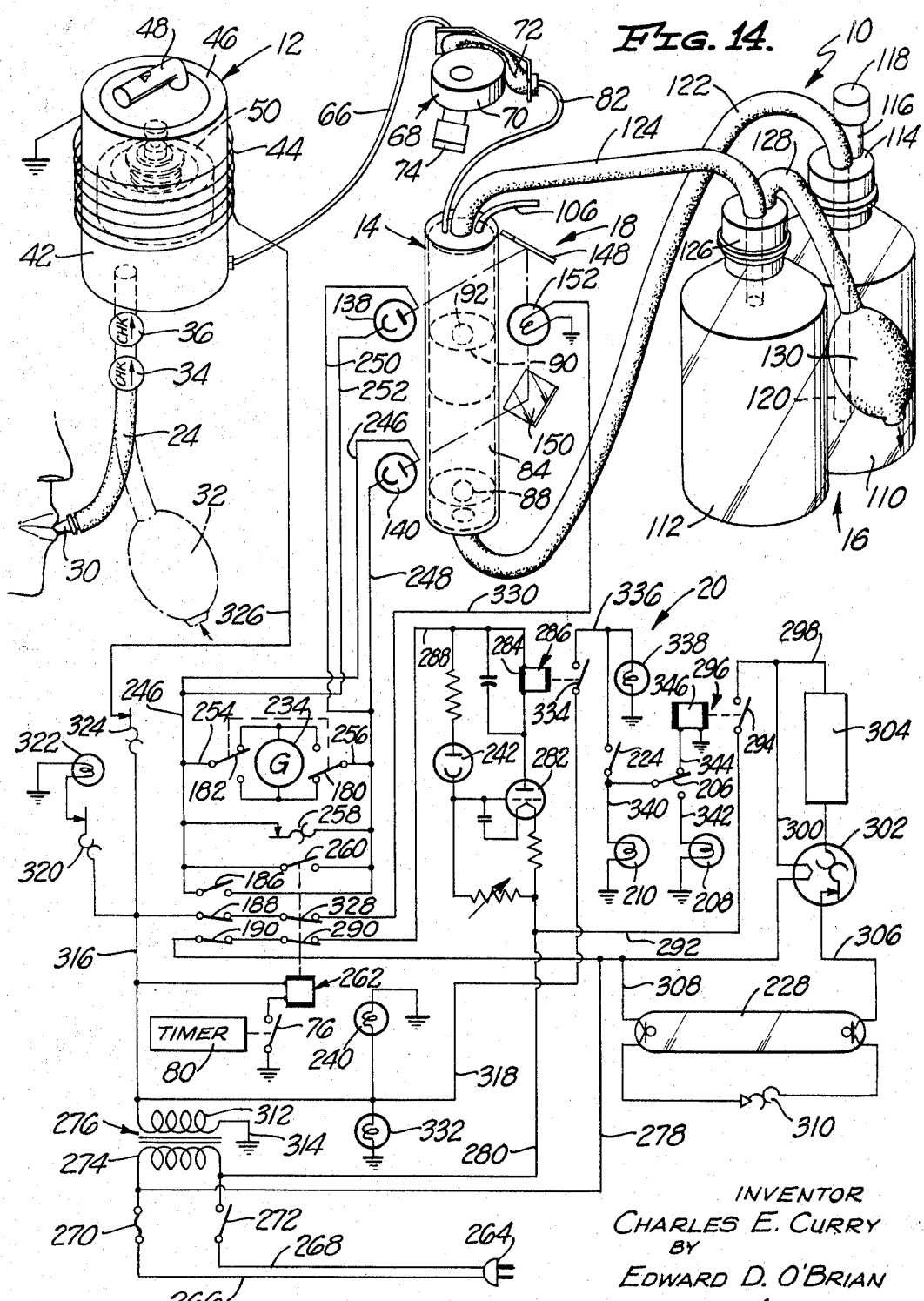

United States Patent Office 3,476,516
Patented Nov. 4, 1969

3,476,516
GAS ANALYZER
Charles E. Curry, 1358 Toledo Way,
Upland, Calif. 91786
Filed Sept. 12, 1966, Ser. No. 578,781
Int. Cl. G01n 21/26, 31/22
U.S. Cl. 23—254                          22 Claims

ABSTRACT OF THE DISCLOSURE

A gas analyzer which is suited for accurately measuring, with the application of suitable safeguards, the amount of alcohol vapor in the alveolar air of a human being, and recording the result of the test. The analyzer includes two transparent chambers containing liquid reagents whose transparency changes on contact with alcohol vapors, the vapors being conducted to one only of these chambers. A photocell views transmitted light from each chamber, the chambers being illuminated by a single, movable light source, whose position is calibrated to read alcohol content for null position of photocell circuit output.

The gas analyzer of this invention comprises a gas input, measurement and control section, a liquid supply, control and waste section, a gas-liquid reaction vessel, optics to measure the light transmission of a standard sample and a reacted sample, readout structure and an electric circuit to relate the various parts. The readout structure is related to the electric circuitry, optics and reaction vessel so that the readout must be appropriately zeroed at the beginning of the test and the gas analyzer must be brought to a condition corresponding to the results of the reaction so that accurate readout results. Optical balance between the reacted sample and standard sample is accomplished by photo cells connected to a galvanometer and bucking each other. However, in order to insure accurate null of the galvanometer, its condition is determined and readout can occur only when in the null position.

Furthermore, in order to prevent change due to aging and voltage fluctuation, a single lamp is used to supply illumination to two blue light transmission reading photo cells for the standard and test samples. This lamp is moved until these photo cell outputs are the same, and thus the lamp position is the readout signal. Another important feature of the present gas analyzer is that, while it uses a standard solution of potassium dichromate and sulfuric acid for alcohol reaction purposes, it employs a bulk source of this solution. Furthermore, a portion of this solution is pumped first to the standard cell and thence through the test cell so that the use of the same solution in both test cells is assured. The entire gas analyzer is arranged so that if any errors occur in the actual readout value of a blood alcohol percentage, such error produces lower rather than higher readings, and thus errors are favorable to the person being tested.

BACKGROUND

The gas analyzer of this invention is primarily directed to the very special circumstance of determining the alcoholic content of human blood by analysis of the exhaled human breath. Such devices have been employed in the past. Such previous devices have, in very broad terms, employed the same general principles of operation in determining the alcoholic content of exhaled breath. The difficulty with previous structures is that skilled operators could purposely create an erroneous alcohol reading and unskilled operators could inadvertently produce an incorrect alcoholic determination. This situation, with respect to past such equipment, arises from the fact that there are insufficient internal controls to require that each step of the operation be correctly carried out. There are insufficient interlocks to prevent maluse of the equipment. Thus, through inadequate care or purposeful misuse, inaccurate results can be obtained. Such inaccurate results are harmful to today's public for breath-alcohol determination equipment is widely used and is widely accepted in the courtroom to prove insobriety. Tests with previous equipment are widely given, especially in cases of suspected insobriety while driving an automotive vehicle. Insobriety is directly related to the percentage of ethyl or grain alcohol in the blood stream. It has previously been satisfactorily proven that the alcoholic content of exhaled breath from deep in the lungs is directly proportional to the blood alcohol content. Thus, such testing can be accurate, provided the equipment for such testing accurately determines the breath alcohol content and the equipment is arranged so that it is interlocked to prevent improper use.

DESCRIPTION

It is thus an object of this invention to provide a gas analyzer which is particularly arranged for the accurate analysis of dissolved alcohol. It is the further object of this invention to provide a gas analyzer which has such built in operational procedures and interlocks that it prints out the test results in such a manner that it can be readily determined that the gas analyzer was correctly operated in making the analysis. It is the further object of this invention to provide a gas analyzer which is specifically adapted for the determination of alcohol vapor content in the deep lung breath of a person being tested and thus to determine the state of the alcoholic intoxication of the person being tested. It is another object of this invention to provide a gas analyzer for determining alcoholic content of exhaled human breath, and to accurately record an indication of the alcoholic content together with recordation of pertinent information which indicates the correct operation of the gas analyzer so that from the record, an observer can determine that the gas analyzer was correctly operated. Other objects and advantages of this invention will become apparent from a study of the following portion of this specification, the claims and the attached drawings.

FIG. 1 is a top front right end isometric view of the gas analyzer of this invention.

FIG. 2 is an enlarged section taken generally along the line 2—2 of FIG. 1.

FIG. 3 is a top plan view, with part of the cover removed, of the gas analyzer of this invention.

FIG. 4 is an enlarged section taken generally along the line 4—4 of FIG. 3.

FIG. 5 is a front elevational view of the gas analyzer of this invention shown with the cover removed.

FIG. 9 is a section taken generally along the line 9—9 of FIG. 6.

FIG. 10 is an enlarged partial section taken generally parallel to the plane of FIG. 9 through the test section of the gas analyzer of this invention.

FIG. 12 is a partial front elevational view showing a portion of the indicating section in a different position than shown in FIG. 5.

FIG. 13 is an enlarged section taken along the line 13—13 of FIG. 12.

FIG. 14 is a schematic view of a portion of the mechanical and gas and liquid handling structure of the gas analyzer of this invention, together with a schematic view of the electric circuitry used in connection wherewith for gas analyzing and result indicating.

Figure 6:
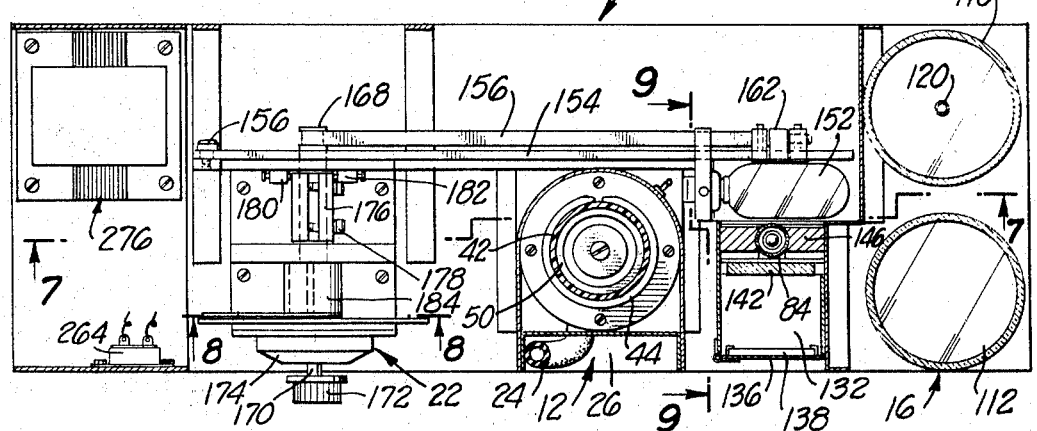
FIG. 6 is a partial horizontal section thereof.

Referring generally to the drawings, the gas analyzer of this invention is generally indicated at 10. Referring more particularly to FIG. 14 and as shown in a number of the other figures, the gas analyzer 10 has several subassemblies which can be conveniently described. The gas input structure is generally indicated at 12, the gas-liquid reaction vessel is indicated at 14, the liquid supply and waste structure is generally indicated at 16. Optics 18 reduce the reaction to electrical signals which are electrically connected into electric circuit 20 and the optics are mechanically connected to the readout structure 22, see FIGS. 5, 8 and 12, which indicates and records the value desired, with suitable interlocks through the electric circuit and protective devices so that a true and accurate readout is assured.

Referring particularly to FIGS. 3, 4, 5, 6 and 14, the gas input structure is shown at 12. The gas input structure comprises sample hose 24, which is normally housed within a suitable compartment 26 in housing 28. The inlet end of sample hose may be alternatively connected to mouth piece 30, so that a breath sample may be discharged through the hose, or to manually operated squeeze bulb 32 which discharges atmospheric air therethrough. Sample hose 24 is connected to serially connected check valves 34 and 36 and check valve 36 is connected to fitting 38 in the bottom head 40 of cylinder 42. Check valves 34 and 36 merely provide redundancy to prevent an inoperative condition of a check valve from permitting withdrawal of breath from the interior of cylinder 42.

Cylinder 42 is fitted with heater 44 so that the cylinder and the air therein may be retained at a proper temperature above the dew point of gas in the cylinder 52, as is described below. Cylinder 42 is also fitted with top head 46 which is fitted with an atmospheric vent in the form of whistle 48. Heads 40 and 46 are sealed with respect to cylinder 42 so that escape of gas is prevented through the joints therebetween. Piston 50 is movably mounted within the interior of cylinder 42. Piston 50 is carefully fitted so that it may be moved upward by breath pressure entering through fitting 38, and yet prevent, in so far as it is reasonably possible, the escape of breath from the lower breath chamber 52 into the atmosphere chamber 54 above the piston. Valve openings 56 are formed through piston 50 and are closed by valve disc 58. Valve stem 60 is secured to valve disc 58 and extends upward through piston to terminate in adjustable stop 62. Spring 64 engages piston 50 and valve stem 60 to urge valve disc 58 to cover openings 56. Thus, as breath enters breath chamber 52 through fitting 38, piston 50 rises until adjustable stop 62 engages top head 46. With an increase in pressure in breath chamber 52, piston 50 continues rising, to rise away from valve disc 58 and open valve openings 56. Thus, further breath is discharged from chamber 52 into chamber 54 and out through whistle vent 48. By means of this construction, the operator can determine by the whistling of whistle vent 48 that the breath chamber 52 has been filled and excess breath is being exhausted. Thus, a very accurate amount of breath can be obtained by this measuring function of breath chamber 52.

Outlet tube 66 extends from breath chamber 52 to control valve 68. Control valve 68 is provided to close off outlet tube 66 so as to prevent movement of breath through outlet tube 66 during the filling of breath chamber 52. Control valve 68 is seen in FIGS. 3, 5 and 14 and comprises cam 70 which is movable against and away from resilient tube 72 by means of the operation of valve handle 74. Tube 72 can be closed by cam 70 to cut off flow through outlet tube 66, or when cam 70 is moved away tube 72 is opened and breath can discharge through outlet tube 66. Handle 74 operates cam 70 so that the valve is closed in the position shown in FIGS. 1, 3, 5 and 14. In this position switch 76 is open. Switch 76 is timer operated, in conjunction with operating lever 78, which is operated by handle 74, loading timer 80. This movement of handle 74 to the left closes switch 76. When timer 80 times out after loading by lever 78, switch 76 is again opened by timer 80. Bubbler tube 82 extends from resilient tube 72 to gas-liquid reaction vessel 14.

Referring primarily to FIG. 10, vessel 14 comprises upright tube 84 which is made of transparent material, preferably glass or suitable polymer composition material, in which the reaction takes place and in which comparison is made of two liquid samples to determine the alcoholic vapor content of breath reacted with one of the samples of the liquid reagent. Tube 84 has liquid inlet fitting 86 which is provided with check ball 88 positioned at the bottom of tube 84. Substantially midway up the height of tube 84 is positioned divider 90 which contains check ball 92. Outlet fitting 94 extends into the top of tube 84 through cap 96. Outlet fitting 94 extends downwardly into tube 84 to terminate in opening 98. The positioning of opening 98 below top of tube 84 permits the establishment of an air space 100. This construction defines standard liquid space or standard sample 102 and test liquid space or test sample 104. In view of the fact that the liquid used in space 102 and 104 is quite corrosive, normal seals are difficult to use. However, polymer composition materials are resistant to the corrosive action of the liquid and thus tube 84, liquid inlet fitting 86, divider 90, outlet fitting 94, and cap 96 are preferably made of suitable polymer composition material resistant to the action of the liquid. The volume of test liquid space 104 is critical, and for this reason outlet fitting 94 is threaded into cap 96 so that it may be screwed up and down to accurately determine the volume of test liquid space 104 between divider 90 and the top of the liquid determined by opening 98.

Bubbler tube 82 extends downward into test liquid space 104 and terminates near divider 90 so that breath passing through bubbler tube 82 bubbles through the liquid in space 104 to accomplish a complete reaction. Vent capillary 106 extends from air space 100 out of the top of tube 84 to vent out of space 104 the breath bubbled in through bubbler tube 82. This vent also prevents a trapped air space, and thus makes it possible to establish an accurate liquid level and thus liquid volume.

Referring now to FIGS. 1, 3, 5, 6, 7 and 14, the liquid supply and waste system 16 is shown therein. Housing 28 has a door 108 on its right end for access to liquid supply bottle 110 which is a closed vessel having top 114. Vent 116 permits the entrance of atmospheric air into bottle 110 through filter 118. Dip tube 120 extends down close to the bottom of bottle 110. Outlet tube 122 is connected to dip tube 120 and is connected to liquid inlet fitting 86 on the bottom of gas-liquid reaction vessel 14.

Outlet fitting 94 is connected by waste tube 124 to cap 126 on waste bottle 112. Again, waste bottle 112 is a closed vessel with two passages through cap 126. Waste tube 124 is connected to one of these passages and exhaust tube 128 is connected to the other. Aspirator 130 is connected to exhaust tube 128. By means of this construction, manual squeezing of aspirator 130 draws liquid from liquid supply 110 through the gas-liquid reaction vessel 14 and into the waste bottle. Flow of new liquid is upward through tube 84 and thus fresh liquid first enters the standard liquid space 102 and then passes through the test liquid space 104. In view of the fact that liquid movement is by means of drawing a vacuum upon the waste bottle, the liquid level in test liquid space 104 is maintained at opening 98. Thus, liquid volume in test liquid space 104 is accurately maintained.

It has been determined that the alcohol content of the deep lung, alveolar air by volume has an alcohol content as compared to the blood alcohol content in ratio of approximately 1 to 2100. Since much data is available on the comparison between blood alcohol content and the state of intoxication, it is convenient to represent a readout of the gas analyzer 10 in terms of blood alcohol percent. For convenience in relating the two figures, the breath chamber 52 preferably has a volume which corresponds at its temperature to a breath volume of 52.5 milliliters of breath temperature, which is one-fortieth of 2100. Thus, the amount of alcohol under consideration is related to one fortieth of a milliliter of blood. It has also been determined that a sensitive color reaction can be used to determine the alcoholic content of this amount of air. A test liquid of approximately 50 percent by volume of sulfuric acid and approximately .025 percent potassium dichromate by volume, in water solvent, has a yellow appearance. When a small amount of alcohol is reacted with this solution, the result is chromium sulfate, potassium sulfate, and acetic acid in water solution. This mixture has a green appearance. The difference can be measured optically in the blue light range. Furthermore, when only a portion of the alcohol necessary for complete reaction is added to the original solution, only a portion of the potassium dichromate is used in the reaction and the blue light transmittance of the reacted solution is an accurate indication of the amount of alcohol reacted. Thus, potassium dichromate and sulfuric acid in water solution are used as the test liquid, and an optical system is arranged to measure the blue light transmittance. A liquid catalyst may also be mixed in the test solution, or a solid catalyst positioned in the test vessel, to speed the alcohol reaction to completion.

Figure 11:
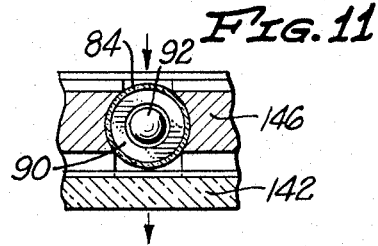
FIG. 11 is a partial horizontal section taken through a portion of the fluid test section of the gas analyzer of this invention.

Referring principally to FIGS. 6, 7, 9, 10, 11 and 14, the optical system 18 will be described. Photo electric cell compartments 132 and 134 are closed, and have an access door 136 closing the front. Photo cells 138 and 140 are mounted on the inside of the door so as to face tube 84. Blue filters 142 and 144 are positioned between tube 84 and the respective compartments. The only light entry into the photo cell compartments is respectively transmitted through these filters. As is seen in FIGS. 6 and 11, tube 84 is mounted in wall 146 which closes the back of these compartments so that the only light incident upon the filters comes respectively through the spaces 102 and 104. Thus, the amount of excitation of the photo cells 138 and 140 is a function of light intensity upon tube 84 at the standard liquid space and test liquid space, together with the amount of blue light absorption of the liquid in these spaces. Mirrors 148 and 150 are respectively mounted to reflect light through these liquid spaces and toward the photo cells. Lamp 152 is mounted between the mirrors and is mounted upon arm 154 which is pivoted to the frame at 156. In view of the fact that the intensity of the light on the photo cells, subject to the absorption in the liquid and in the filter, varies inversely as the square of the distance from the photo cells to the lamp 152, the positioning of lamp 152 between the mirrors 148 and 150 can be used to make the amount of light incident upon the photo cells the same. Furthermore, the positioning of the lamp 152 can be used as a measure of the absorption. The arcuate path of the lamp does not depart sufficiently from a straight line to affect the accuracy.

Tape 156 is quite flexible, but it is relatively inextensible. Spring 158 is an extension spring with its upward end connected on bracket 160, which is secured to the frame. The lower end of spring 158 is hooked to the upper end of tape 156. Tape 156 is clamped on arm 154 behind lamp 152 by clamp 162. Tape 156 extends downward around guide rollers 164 and 166 and extends upward where it is wrapped around and secured to drum 168 on control shaft 170. Thus, the rotative position of control shaft 170 is a function of the position of lamp 152. Control shaft 170 extends through the front of housing 28 and has manual knob 172 fastened thereon. If desired, gear reducer 174 can be interposed between manual knob 172 and rear, operative part, of shaft 170. By this means, several turns of manual knob 152 may be required to turn the rear end of shaft 170 through its operative range.

Figure 7:
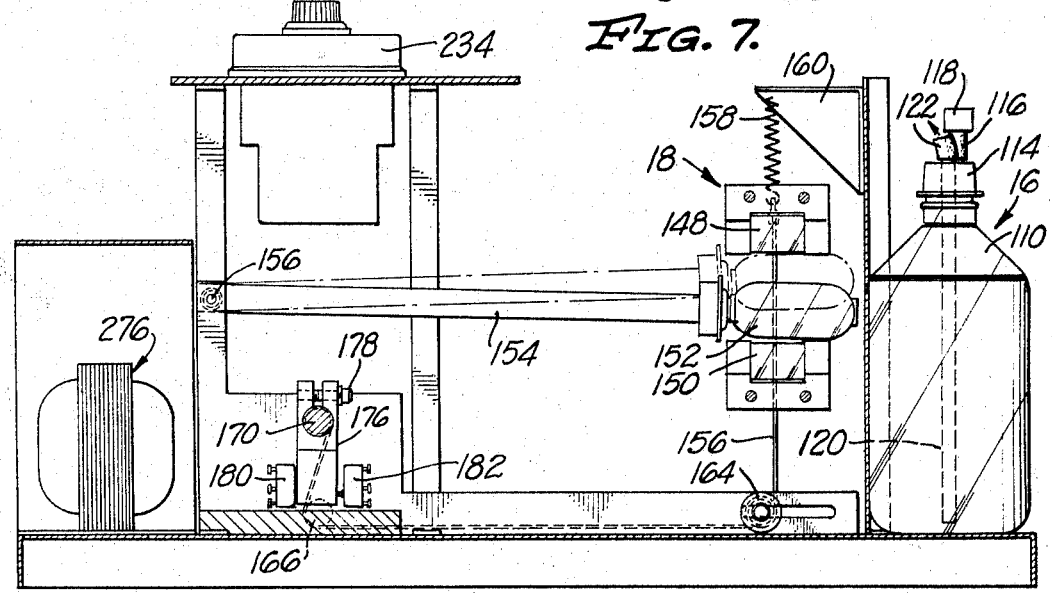
FIG. 7 is a section taken generally along the line 7—7 of FIG. 6.
Figure 8:
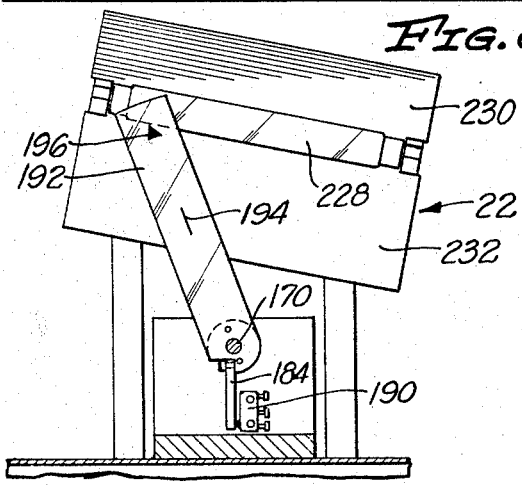
FIG. 8 is an enlarged partial section taken generally along the line 8—8 of FIG. 6.

Switch operator 176, see FIGS. 2, 6 and 7, is mounted on shaft 170. It is frictionally mounted thereon with a slip fit adjustable by screws 178. Upon rotation of shaft 170, it turns through a small arc and then slips on the shaft. Switches 180 and 182 are mounted adjacent switch operator 176 so that upon clockwise rotation of shaft 170, when viewed from the front, switch 180 is operated and with counter clockwise operation switch 182 is operated. Fixed to shaft 170 is second switch operator 184, see FIGS. 2 and 8, adjacent which switches 186, 188, and 190 are positioned. These switches are all actuated when shaft 170 is in its farthest counter clockwise position, as is seen in FIG. 8. Also secured to shaft 170 at this point is pointer 192. Pointer 192 is fixed to the shaft so that its position is always directly representative of the position of lamp 152 between the mirrors. Pointer 192 is made of transparent material, preferably of synthetic polymer composition material such as acrylic. It carries an opaque center line 194 thereon, as well as arrow 196. As is seen in FIG. 13, arrow 196 is a raised member secured onto pointer 192. Arrow 196 is made of opaque material so that its image is photoprintable.

Dial 198 is rotatably mounted upon shaft 170, directly in front of pointer 192. Dial 198 is urged in the counter clockwise direction by spring 199, and unless otherwise restrained, spring 199 swings dial 198 in the counter clockwise direction to the upright position shown in FIG. 5. Dial 198 extends upward to overlie, at its upper end, lock plate 200 which is secured to the basic frame structure. Dial 198 has an arcuate dial slot 202 formed therein for the reception of arrow 196, as is seen in FIG. 13. As is seen in FIG. 5, indicia 204 are formed on dial 198 adjacent dial slot 202. The indicia read from a low value at the right end of the scale, as is seen from the front of the equipment, to a high value on the left end. The indicia are preferably calibrated so as to read in hundredths of a percent of blood alcohol. The relationship of arrow 196 to indicia 204 represents the read-out of output information respecting the blood alcohol content of the gas analyzer 10. Mounted on the back of dial 198 are several additional pieces of equipment. Switch 206 is positioned so that when pointer 192 is at the right-most end of dial slot 202, it is actuated. Lamp 208 is mounted on the back of dial 198 and is so positioned that when pointer 192 is in the right-most, or zero position, it overlies center line 194 on pointer 192. Furthermore, to clearly indicate this position of opaque center line 194, a clear circle of material is provided upon opaque dial 198 so that the center line 194 is superimposed as a black diameter line upon a white circle when the pointer is in the right-most or zero position.

Mounted upon the back of lock plate 200 is lamp 210. Lock plate 200 is of opaque material and carries thereon a suitable clear hole through which the light of lamp 210 can shine in the forward direction.

Hinge 212 is mounted upon the front of dial 198. It hingedly carries scale locking plate 214 which overlies the entire upper portion of dial 198. The spacing is arranged so that photo sensitive paper 216, see FIG. 13, can be placed upon dial 198 and retained in position by scale locking plate 214. Preferably, hinge 212 is arranged so that scale locking plate 214 is spring urged to the upward, closed position shown in FIG. 13.

Test record door 218 is hinged to the front of housing 28, as is seen in FIGS. 1 and 2. It has a latch operated by latch knob 220 to permit opening the door, and to permit locking of test record door 218 in the closed position shown in FIGS. 1 and 2. Clamp 222 is secured to the top of door 218 and extends forward so as to engage the front of scale locking plate 214 to lock dial 198 against lock plate 200, when the door is closed. Switch 224 is mounted so as to be actuated by latch 226.

Positioned behind dial 198 and lock plate 200 is main exposure lamp 228, see FIG. 2. Lamp 228, as is seen in FIG. 5, lies in such a position that when lighted it illuminates the entire scale of indicia 204. It also illuminates arrow 196. Reflectors 230 and 232 aid in properly distributing the light. Thus, when illuminated, lamp 228 projects light upon photo sensitive paper 216 to indicate the position of the indicia on the photo sensitive paper as well as the position of arrow 196 with respect to that indicia.

Galvanometer 234 is mounted top of housing 28, and is preferably positioned over manual control knob 172 so that it may be observed in connection with the operation of knob 172. Galvanometer 234 is, for the most part, a conventional stock instrument. It has an electromagnetic movement of great sensitivity and has a pointer 236 which is visible against a dial face through window 238. Galvanometer 234 is of such construction that its pointer 236 stands at the center point when no voltage is supplied to the windings of the galvanometer. This is the null position. In order to have an electric output signal upon having the galvanometer reach its null position, the galvanometer is modified by the insertion of a photo cell and photo cell exciter lamp therein. As is seen in the broken away portions of the galvanometer in FIGS. 2 and 3, exciter lamp 240 and photo cell 242 are positioned therein. A narrow light passage connects the exciter lamp and photo cell so that in the absence of an obstruction, the lamp illuminates the photo cell. Pointer 236 carries flag 244 which is positioned in such a manner that when the galvanometer is at its null point, the flag cuts off illumination from the photo cell. This signal is used for appropriate actuation of the readout structure 22 so that accurate, permanent results are recorded.

Referring now to FIG. 14, the electric circuit relating the various electrical portions of the gas analyzer will be described. The photo cells which read the blue light transmittance of the two samples in the column are self-powered in the sense that they generate voltage when excited. Photo cell 140 is connected to the galvanometer leads by lines 246 and 248. Photo cell 138 is connected in the opposite voltage sense with its line 250 connected to line 248 and its line 252 connected to line 246. Thus, the voltages of these cells are bucking each other so that when the output voltages are the same the galvanometer reads at its null point. The galvanometer is connected to galvanometer leads 246 and 248 respectively through lines 254 and 256. These are respectively connected to switches 182 and 180 which reverse the polarity of galvanometer 234 with respect to lines 246 and 248. The switches are operated by the direction of the rotation of shaft 170 so that reversal of shaft rotation causes reversal of polarity of galvanometer 234 between its leads 246 and 248. Polarity reversal is desired so that the galvanometer approaches the null point from the left, both during the null for zero setting and the null for alcohol level testing. This is favorable to the person whose breath is being tested and thus reduces legal questions on accuracy of the testing equipment. Thermostat 258 is connected between leads 246 and 248 and is arranged so that it is closed when the temperature is below the desired operating temperature. Thus, thermostat 258 serves as a short circuiting shunt which prevents galvanometer movement when the temperature within the cabinet is below the required operating temperature. Contact 260 on relay 262 is closed when relay 262 is energized and is also connected as a shunt between galvanometer leads 246 and 248. It is thus seen that the circuitry of the blue light transmittance photo cells and the galvanometer is independent of external powering.

External power is conventionally supplied from a normal 115 volt 60 cycle source which is connected by plug 264. Lines 266 and 268 lead respectively through fuse 270 and manual on-off switch 272 to the primary 274 of transformer 276. The on-off switch 272, various indicator lights, and optionally fuse 270 are positioned on the front of housing 28, as shown in FIG. 1.

At the primary 274 power line 266 is connected to common line 278. The other side of the power is connected to line 268 above switch 272 by line 280. Thence it is connected to two parallel systems. The first parallel system comprises null indicating photo cell 242 with its amplifying triode 282. Triode 282 is connected through coil 284 of relay 286. The other side of coil 284 is connected to line 288. Photo cell 242 is also connected to lines 280 and 288 as well as to the grid of triode 282. This arrangement is such that when photo cell 242 has light impinging upon it, triode 282 is nonconductive and when the light is cut off of photo cell 242, triode 282 becomes conductive to energize coil 284. Thus, realy 286 is responsive for the action of pointer 236 so when the pointer is null, relay 286 is energized. Line 288 is serially connected through normally closed contact 290 of relay 262 and switch 190 back to line 278.

In parallel to the just described circuit, line 292 is connected to line 280 and to normally open contact 294 of relay 296. The other side of contact 294 is connected to line 298. Line 298 is connected by line 300 to the heater of time delay 302. The other side of the heaater is connected to common line 278. Line 298 is also connected to ballast 304 which is in turn connected to the main power contact of time delay 302. The output of time delay 302 is connected by line 306 to lamp 228 which is also connected by line 308 to common line 278. Lamp 228 is an ultra violet lamp and has a conventional starter 310 connected thereacross. This arrangement is such that when normally open contact 294 is closed, lamp 228 is lighted and the time delay 302 is started, and after it times out, lamp 228 is extinguished. This regulates exposure.

Secondary 312 of transformer 276 has one side connected to ground 314. The other side of secondary 312 is connected to power lines 316 and 318. Power line 316 is connected to thermostat 320 which is positioned within housing 28 and arranged so that it closes when the interior of the housing reaches the minimum operating temperature. Lamp 322 is positioned on the face of the housing so that it is externally visible and is connected to thermostat 320 and ground so that when the case temperature reaches the operating point, the lamp goes out. Power line 316 is also connected to heater control thermostat 324 which is connected by line 326 to heater 44. The other end of heater 44 is grounded. Thermostat 324 thus warms the gas input structure 12, and all of the adjacent equipment to the operating temperature. Cycling of thermostat 324 maintains this temperature. Lamp 322 indicates that the minimum operating temperature is reached within the cabinet. Heater 44 is arranged so that all of the gas handling equipment is adequately warmed to prevent condensation. This includes the sample hose 24 inside of compartment 26. However, if faster or more uniform heating of the entire cabinet 28 is desired, additional heaters may be connected in parallel to heater 44 and spaced throughout the interior of housing 28. Power line 316 is also connected through normally closed switch 188 and normally closed contact 328 of relay 262 to line 330. Line 330 is connected to lamp 152 which supplies the light through the test spaces to energize photo cells 138 and 140. Switches 186, 188, and 190 are in the position shown when pointer 192 is turned away from the left most position. The pointer is turned into the left most position, shown in FIG. 8, when the gas analyzer is at rest. In the rest position switch 186 is closed to shunt the galvanometer and switches 188 and 190 are opened to de-energize portions of the circuit, including lamp 152 and photo cell 242. Thus, the gas analyzer can be left on to maintain the housing temperature, for extended periods of time, without energizing these portions of the circuit to reduce their life.

Power line 318 is connected to pilot lamp 332 which indicates that the circuit is on. It is also connected to null exciter lamp 240 to maintain its illumination. Line 318 is connected to normally open contact 334 of relay 286. Contact 334 is connected to line 336 which is connected to null indicator light 338 which is visible from the face of the housing. Line 336 is also connected to door switch 224 which is open when door 218 is open. Door switch 224 is connected to line 340 which is connected to scale lamp 210. Thus, when the galvanometer reaches null and contact 334 is closed, and door 224 is closed, scale lamp 210 is illuminated to make a spot on the photo sensitive paper.

Line 340 is connected to zero switch 206. Switch 206 has two contacts. The lower contact is connected to line 342 and line 342 is energized when pointer 192 is in its right-most position as shown in FIG. 12. Line 342 is connected to zero lamp 208 which is illuminated on that occasion. The upper contact of zero switch 206 is closed when pointer 192 is away from the zero scale position. When it is away, line 344 is connected to line 340 by this switch. Line 344 is connected to coil 346 of relay 296 to thus control the illumination of lamp 228.

The operation of gas analyzer 10 is apparent from the previous description of its parts. In use, liquid supply bottle 110 is filled with a suitable solution of sulfuric acid and potassium dichromate. The analyzer 10 is plugged into a suitable supply of electric power and switch 272 is turned on. This lights pilot light 332 and turns on heater 44, under control of thermostat 324. After the housing 28 has reached operating temperature, lamp 322 goes out to indicate the analyzer is ready for operation. New test liquid is drawn into tube 84 by actuation of aspirator 130. By drawing a partial vacuum with this aspirator, the solution moves from supply bottle 110, through tube 84 and passes upward through check valves 88 and 92. In view of the fact that liquid movement is by aspiration, the amount of liquid in the test liquid space 104 is determined by the height of opening 98. The liquid condition thus is ready for testing.

The gas handling system is first purged. Control valve 68 is closed by moving handle 74 to the right. Squeeze bulb 32 is placed on the end of sample hose 24 and atmospheric air is blown into breath chamber 52 to raise piston 50 to the top. Squeeze bulb 32 is operated a sufficient number of times so that the piston is fully raised and breath chamber 52 is fully purged by the movement of air through now open valve openings 56 and out through whistle vent 48. This also levels the liquid at the height of opening 98. When purging is complete, valve handle 74 is moved to a position where resilient tube 72 is open. This movement loads timer 80 and closes switch 76 so that upon timing out of the timer after a set time interval, switch 76 is opened. If desired, handle 74 can be provided with two positions, in addition to the closed position. In th center, purge, position resilient tube 72 is fully opened and the timer 80 is loaded so that it times out in about 60 seconds. In the fully leftward, test, position, resilient tube 72 is fully open and timer 80 is loaded so that it times out in approximately 90 seconds.

Upon opening of valve 68, the weight of piston 50 causes discharge of the air in breath chamber 52 through bubbler tube 82. The purpose of the purge with atmospheric air is to cause such oxidation of the reagent liquid in the test liquid space 104 as may occur from the components of the ambient atmospheric air and to preclude a possible claim that residual alcohol remained in the cylinder or attachments thereto from a previous test. Few oxidation causing components are present and therefore 60 seconds is adequate time to permit this oxidation to occur. The piston 50 descends to discharge this air from breath chamber 52 in approximately 30 seconds so that 60 seconds reaction time on purging is fully adequate for any reaction that might take place.

During the time it takes for timer to time out, test record door 218 is open to open switch 224. Furthermore, scale locking plate 214 is drawn forward and appropriate piece of photo sensitive paper 216 is placed therebehind. Scale locking plate 214 is released so that its spring return maintains the photo sensitive paper in place. Upon timing out of timer 80, which is accompanied by an audible signal, and with door 218 still open, knob 172 is turned in a clockwise direction, which turns shaft 170 in a clockwise direction, as seen from the front of the analyzer. This action opens switch 186 and closes switches 188 and 190. It also causes upward motion of lamp 152, which is illuminated due to the closing of switch 188 and contact 328. Because of this illumination, light is falling upon photo cells 138 and 140 in accordance with blue light transmittance of the liquids in standard liquid space 102 and test liquid space 104. Dial 198 is spring loaded in the counter clockwise direction to the upright position shown in FIG. 5 and arrow 196 on pointer 192 reaches the right end of the scale, as seen from the front, with the zero mark thereon before the output of photo cells 138 and 140 is balanced. When arrow 196 reaches the right end of dial 198, it moves switch 206 to make contact with line 342 for the potential energization of zero verifying lamp 208. Knob 172 is continued to be moved in the clockwise direction, now with clockwise motion of both pointer 192 and dial 198. During this motion, galvanometer pointer 236 is observed and motion is slow as it reaches its null point. When it reaches its null point, flag 244 interrupts the light to photo cell 242 to cause energization of relay 286 and closing of contact of 334. This causes illumination of null lamp 338 and energization of line 336. The gas analyzer is now zeroed and door 218 is closed. Such closure closes switch 224 to energize zero verifier lamp 208 and scale lamp 210. Lamp 208 makes a visible spot on the photo sensitive paper to prove that the gas analyzer has been properly zeroed. Scale light 210 makes a similar spot, which in conjunction with a later spot proves that the photo sensitive paper has not been moved between the zero setting and the actual testing.

The gas analyzer is now ready for receipt of a person's breath to determine whether or not the breath has an alcoholic vapor content. Valve 68 is now in the normally closed position, and switch 76 is open, mouth piece 30 is placed on sample hose 24 and the subject tested blows breath through hose 24 into breath chamber 52. A full breath is required, for the deep lung breath or alveolar exhalation is most proportional with respect to a comparison between blood alcohol content and breath alcohol content. The subject raises piston 50 and purges breath chamber 52 by exhalation which opens valve opening 56 and exhausts excess air out of whistle vent 48.

When a proper breath is obtained, valve 68 is opened by moving valve handle 74 fully to the left closing contact 76. This also lets timer 80 time out and reopen contact 76 after 90 seconds. The breath in breath chamber 52 is bubbled through the liquid in test liquid space 104 by discharge by piston weight through bubbler tube 82. If there is alcohol vapor in the discharged breath, an oxidation reaction occurs in the liquid in test liquid space 104 to change the blue light transmittance of that liquid. This reaction takes place well within the 90 seconds before timing out of timer 80.

Upon timing out of timer 80, in accordance with the audible signal of the timer, switch 76 is opened to de-energize relay 262. Such de-energization places the photo cells 138 and 140 and 242 back into operative condition. If an alcohol reaction has taken place in the liquid in test liquid space 104, the blue light transmittance is changed, and the photo cells 138 and 140 are now unbalanced so that galvanometer 234 indicates off of null, and means a new null position must be found. To obtain the null position, knob 172 is moved in the counter clockwise position to rotate shaft 170 in that direction. This both moves pointer 192 to the left and draws lamp 152 farther downward. It must be noted that since door 218 is closed, dial 198 is clamped in the fixed position marked by the scale vertifier lamp 210. Thus, the dial and the photo sensitive paper remain in place while only pointer 192 and its arrow 196 move to the left as seen from the front of the analyzer. A new null is found by rotation of knob 172, and this new null is determined by the relative blue light transmittance of the samples by positioning of lamp 152 to the point where the outputs of photo cells 138 and 140 are equal to cause null of the galvanometer 234. At this point, illumination ceases on photo cell 242 and relay 286 is energized. Since the zero switch 206 has been released by pointer 192 moving away from it, it is now connected to line 344. Thus, when null is reached, relay 296 is energized. This lights lamp 228 to illuminate the entire rear of the scale of indicia 204 as well as arrow 196 to photo sensitively indicate upon paper 216 the relationship of the arrow and the indicia. This indicates the percentage of blood alcohol and permanently records it. At the same time, the scale verifier lamp 210 is lighted. So long as the photo sensitive paper has not moved with respect to the indicia, the lamp 210 further exposes the same spot on the photo sensitive paper. Should there have been motion, which would make for inaccurate testing, an additional spot will be shown on the paper to indicate this inaccuracy of the test. After an adequate exposure has been made, timer 302 cuts off lamp 228, door 218 is opened and photo sensitive paper 216 is removed. If necessary, it is fixed for permanent test results.

All that is necessary to place the gas analyzer in standby condition is to turn control knob 172 counter clockwise to the fullest extent. In this position, arrow 196 is at the left end of the scale and dial 198 is in the upright position of FIG. 5 wherein switches 186, 188 and 190 are operated by second switch operator 184 to the opposite position shown in FIG. 14. In this condition, the gas analyzer maintains its temperature but only the minimum amount of circuitry is energized. In this condition, the gas analyzer is ready for another test upon repeating of the operational steps outlined above. If a complete shutdown is desired, switch 272 is turned off for a complete de-energization of the circuitry.

This application having been described in its preferred embodiment, it is clear that it is susceptible to numerous modifications and embodiments within the ability of the routine artisan and without the exercise of the inventive faculty. Accordingly, the scope of this invention is defined by the scope of the following claims.

I claim:
1. A gas analyzer which comprises:
   a test chamber and a standard chamber, the walls of said chambers being transparent;
   means for bubbling a gas through said test chamber;
   a photocell mounted adjacent each of said chambers;
   a lamp movably mounted adjacent said chambers so that light therefrom will actuate both the said photocells;
   a galvanometer connected to both of said photocells for indicating equal output of said photocells, said galvanometer being in a null position when the outputs of said photocells are equal;
   an indicator means connected to said lamp so as to be moved during movement of said lamp, said indicator means being a means for indicating the position of said lamp;
   a recording means for indicating the position of said indicating means located adjacent to said indicator means; and
   means for operating said indicator means so as to obtain a record of the position of said indicator means operated by said galvanometer reaching said null position.
2. A gas analyzer which includes:
   a transparent test vessel;
   a check valve positioned within said test vessel intermediate the ends thereof so as to divide said test vessel into an upper test chamber and a lower standard chamber;
   a separate photocell means located adjacent to said test chamber and another separate photocell means located adjacent to said standard chamber;
   both of said photocell means being located on the same side of said test vessel so as to receive light transmitted through said test vessel;
   an arm pivotally mounted adjacent to said test vessel;
   a lamp mounted on said arm so as to be capable of being moved with respect to said test vessel, said lamp being located adjacent to said valve in said test vessel;
   mirrors located adjacent to said lamp, one of said mirrors being located adjacent said test chamber and the other of said mirrors being located adjacent to said standard chamber;
   said mirrors being positioned so as to direct illumination from said lamp through said chambers to said photocells.
3. A gas analyzer as claimed in claim 2 including:
   inlet means for supplying a fluid to said test vessel including both of said chambers connected to the bottom of said standard chamber,
   a liquid outlet positioned so as to extend into said test chamber from the top thereof and
   means for bubbling a gas into the bottom of said test chamber adjacent said valve.
4. A gas analyzer particularly adapted for the measurement of ethyl alcohol in air, said gas analyzer comprising:
   a test vessel, said test vessel having a standard chamber and a test chamber;
   a liquid supply, said liquid supply being connected to supply reagent liquid to said standard chamber and said test chamber, said liquid supply being adapted to carry a reagent liquid which changes in appearance when reacted with gas to be tested;
   gas supply means, said gas supply means being connected to bubble gas through reagent liquid in said test chamber so as to react material in said gas supply means with the reagent liquid in said test chamber, and
   photocell means mounted with respect to said test vessel, said photocell means being for comparing the appearance of said standard chamber and said test chamber;
   a galvanometer connected to said photocell means, said galvanometer indicating equal output of said photocell means to thus indicate corresponding appearances of liquid in said standard chamber and said test chamber;
   a flag on said galvanometer;
   galvanometer photocell means controlled by said flag;
   said galvanometer photocell means being capable of reacting when said galvanometer is in a null position.
5. The gas analyzer of claim 4 wherein said galvanometer photocell controls the exposure of photo sensitive paper at said dial so as to photographically record the relative position of said pointer in said dial when said galvanometer indicates a null point.
6. A gas analyzer particularly adapted for the measurement of ethyl alcohol in air, said gas analyzer comprising:
   a test vessel, said test vessel having a standard chamber and a test chamber;
   a liquid supply, said liquid supply being connected to supply reagent liquid to said standard chamber and said test chamber, said liquid supply being adapted to carry a reagent liquid which changes in appearance when reacted with gas to be tested;
   gas supply means, said gas supply means being connected to bubble gas through reagent liquid in said test chamber so as to react material in said gas supply means with the reagent liquid in said test chamber, and photocell means mounted with respect to said test vessel, said photocell means being for comparing appearance of said standard chamber and said test chamber;
a photocell exciter lamp movably-mounted adjacent to said photocell means;
a valve connected in said gas supply means to control the discharge of gas through said test chamber;
a galvanometer,
a pointer movable with respect to said dial and said galvanometer, said pointer being connected to said photocell exciter lamp so as to be movable therewith;
said photocell means being connected to said galvanometer to indicate a null point on said galvanometer when said photocell means indicates corresponding appearances in said standard chamber and said test chamber;
a galvanometer photocell means indicating the null point of said galvanometer;
recording means at said dial;
an electric circuit means, said electric circuit means being connected to said galvanometer photocell means so that when said galvanometer indicates a null point said recording means is actuated to record the position of said pointer with respect to said dial.

7. The gas analyzer of claim 6 wherein said pointer is adapted to occupy a zero position with respect to said dial and is adapted to occupy a reading position with respect to said dial, said electric circuit being connected to said recording means so as to successively record said relative zero position and said reading position of said pointer with respect to said dial.

8. A gas analyzer particularly adapted for the measurement of ethyl alcohol in air, said gas analyzer comprising:
an upright column serving as a test vessel, said test vessel having a standard chamber and a test chamber located above said standard chamber;
a check valve located in said test vessel between said standard chamber and said test chamber, said check valve separating said chambers and preventing flow from said test chamber to said standard chamber;
a liquid supply, said liquid supply being connected to supply reagent liquid to said standard chamber and said test chamber, said liquid supply being adapted to carry a reagent liquid which changes in appearance when reacted with gas to be tested;
gas supply means including a bubbler tube extending into said test vessel adjacent to the bottom of said test chamber, said gas supply means and said bubbler tube being connected to said test chamber so as to bubble gas through reagent fluid in said test chamber so as to react material in said gas supply means with reagent fluid in said test chamber, and
photocell means mounted with respect to said test vessel said photocell means being for comparing the appearance of said standard chamber and said test chamber;
said photocell means comprising first and second photocells and a movably-mounted photocell exciter lamp, said first photocell being mounted adjacent said standard chamber and said second photocell being mounted adjacent said test chamber, said lamp being movable with respect to said chambers so as to vary the amount of light falling upon said photocells;
a galvanometer connected to said photocells, said photocells being connected to one another and to said galvanometer so that said photocell exciter lamp can be moved to balance the output of said photocells by observing a null position on the galvanometer.

9. The gas analyzer of claim 8 wherein said test chamber has a top, liquid outlet means extending through said top of said test chamber and into said test chamber, said liquid outlet means having an opening, the opening in said liquid outlet means being positioned below said top of said test chamber and being adjustable with respect to the bottom of said test chamber, said opening defining the amount of reagent liquid in said test chamber so that upon adjustment of said outlet means with respect to the bottom of said test chamber, the amount of reagent liquid in said test chamber can be accurately controlled.

10. The gas analyzer of claim 9 wherein said test vessel comprises a transparent tube, the reagent liquid supply being connected to the bottom of said tube by connection means, said connection means being made of polymer composition material and including an inlet check valve which permits entry of reagent liquid through said inlet check valve into said standard chamber, said separating check valve being between said standard chamber and said test chamber, said separating check valve being made of material resistant to reaction with the reagent liquid, said outlet means being made of polymer composition material, said standard chamber and said test chamber thus being axially aligned with respect to each other, first and second mirrors in association with said standard chamber and said test chamber, said photo cell exciter lamp being positioned between said first and second mirrors so that movement of said lamp towards and away from said first and second mirrors changes the optical distance between said lamp and said first and second photo cells.

11. A gas analyzer particularly adapted for the measurement of ethyl alcohol in air, said gas analyzer comprising:
a test vessel, said test vessel having a standard chamber and a test chamber;
a liquid supply, said liquid supply being connected to supply reagent liquid to said standard chamber and said test chamber, said liquid supply being adapted to carry a reagent liquid which changes in appearance when reacted with gas to be tested;
gas supply means, said gas supply means being connected to said test vessel so as to bubble gas through reagent liquid in said test chamber so as to react material in said gas supply means with reagent liquid in said test chamber;
said gas supply means including a gas cylinder having an inlet and an outlet located in the bottom thereof, a piston movably mounted within said gas cylinder, a valve mounted on said piston, said valve opening the space beneath said piston to the atmosphere when said piston is located within said cylinder above the bottom of said cylinder, said outlet being connected to said test vessel, and
photocell means mounted with respect to said test vessel, said photocell means being for comparing the appearance of said standard chamber and said test chamber.

12. The gas analyzer of claim 11 wherein said valve in said piston comprises a valve opening in said piston and a valve disk positioned to cover said opening, stop means connected to said valve disk, said stop means engaging said cylinder to open said valve opening when said piston reaches a predetermined position within said cylinder so as to precisely limit the volume of said sample space by opening said valve between said sample space and said atmosphere connected space when said piston reaches a predetermined position within said cylinder.

13. The gas analyzer of claim 12 wherein said cylinder is vertically positioned so that gas pressure raises said piston to increase the volume of said sample space and gravity acts upon said piston to lower said piston to drive gas into sample space through said test chamber, said valve disk mounted stop being adjustable so that the maximum volume of said sample space is adjustable.

14. The gas analyzer of claim 13 wherein a heater is positioned on said cylinder, said heater being adapted to maintain the temperature of said cylinder above the dew point of the gas in said sample space in said cylinder so as to prevent condensation within said sample space.

15. A gas analyzer particularly adapted for the measurement of ethyl alcohol in air, said gas analyzer comprising:
- a test vessel, said test vessel having a standard chamber and a test chamber;
- a liquid supply, said liquid supply being connected to supply reagent liquid to said standard chamber and said test chamber, said liquid supply being adapted to carry a reagent liquid which changes in appearance when reacted with gas to be tested;
- gas supply means, said gas supply means being connected to bubble gas through reagent liquid in said test chamber so as to react material in said gas supply means with the reagent liquid in said test chamber, and
- photocell means mounted with respect to said test vessel, said photocell means being for comparing the appearance of said standard chamber and said test chamber;
- a movable means;
- a photocell exciter lamp connected to said movable means so that the position of said movable means corresponds to the position of the exciter means with respect to said photocell means;
- a pointer fixed to said movable means,
- a dial movably mounted with respect to said movable means, said dial and said pointer being interengaged so that said pointer can engage said dial to move said dial to a zero position.

16. The gas analyzer of claim 15 wherein dial clamp means is provided to clamp said dial into position so that when said dial is clamped said pointer can move with respect to said dial to indicate other than a zero position of said pointer with respect to said dial.

17. The gas analyzer of claim 16 wherein said movable means is a rotary shaft.

18. The gas analyzer of claim 16 wherein photo sensitive paper holding means is provided on said dial so that photo sensitive paper can be retained with respect to said dial to record the position of said dial and the relative position of said pointer with respect to said dial.

19. The gas analyzer of claim 16 wherein said dial is spring loaded with respect to said lamp so that said dial is urged toward a zero indicating position with respect to said pointer when said dial is unclamped.

20. The gas analyzer of claim 19 wherein a lamp is positioned on said dial, said lamp being positioned to indicate the relative zero position between said dial and said pointer.

21. The gas analyzer of claim 20 wherein a dial position indicating lamp is positioned with respect to said dial, said dial position indicating lamp being adapted to expose the photo sensitive paper so as to indicate that the photo sensitive paper and said dial have remained in position.

22. The gas analyzer of claim 21 wherein a dial exposure lamp is positioned adjacent said dial, said dial exposure lamp being arranged to photographically record the position of said pointer with respect to said dial when said pointer is away from the zero position of said dial.

References Cited

UNITED STATES PATENTS

| | | | |
|---|---|---|---|
| 2,824,789 | 2/1958 | Borkenstein | 23—254 |
| 2,968,536 | 1/1961 | Smith | 23—254 |

MORRIS O. WOLK, Primary Examiner

R. M. REESE, Assistant Examiner

U.S. Cl. X.R.

356—206, 244